Sept. 30, 1941.  A. L. FORSTER  2,257,112
MANUFACTURE OF SPECIAL SHAPES OF HEAT AND SOUND INSULATION BODIES
Filed Oct. 13, 1938
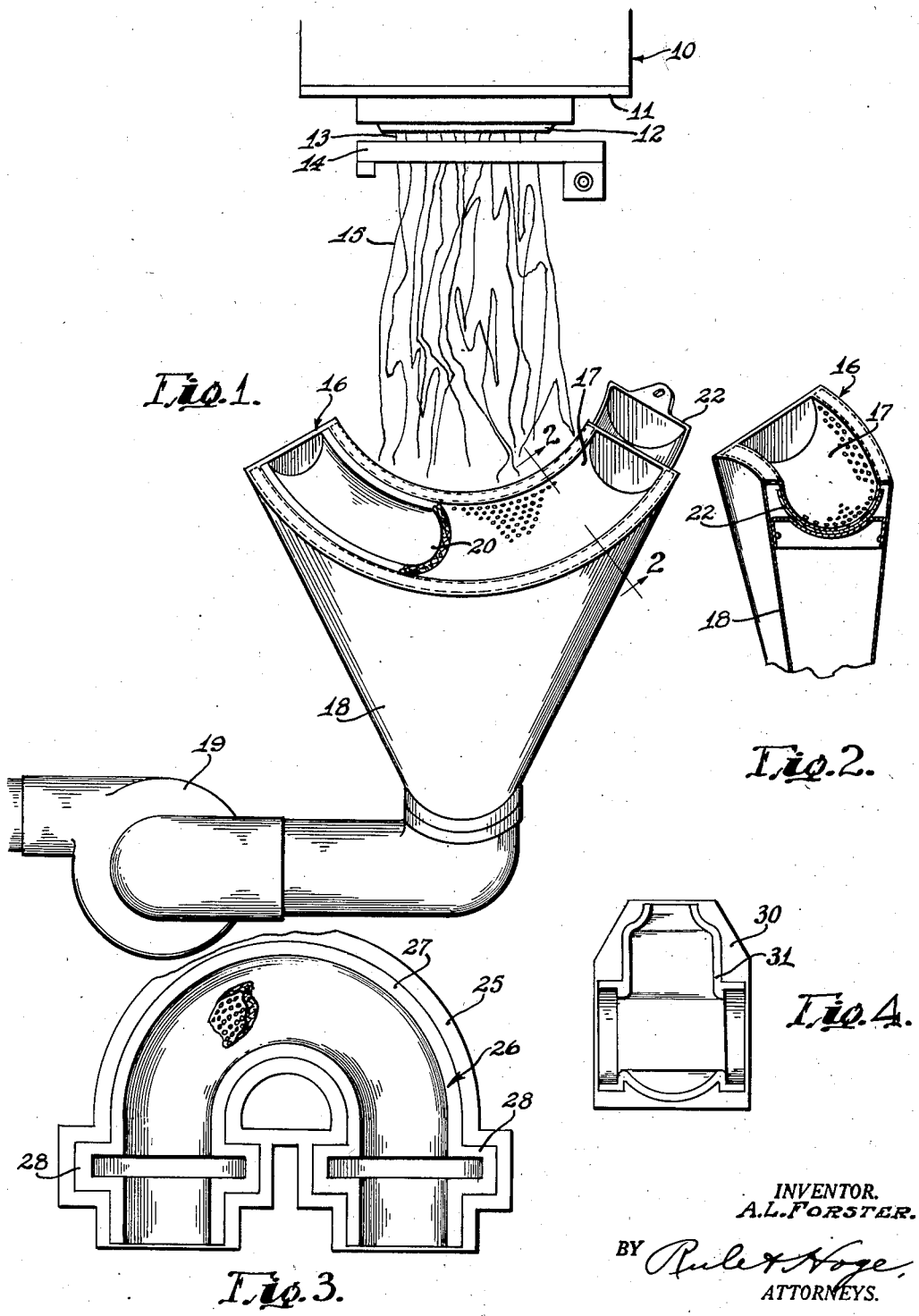
INVENTOR.
A. L. FORSTER.
BY
ATTORNEYS.

Patented Sept. 30, 1941

2,257,112

UNITED STATES PATENT OFFICE 2,257,112

MANUFACTURE OF SPECIAL SHAPES OF HEAT AND SOUND INSULATION BODIES

Alfred Lindsay Forster, Glasgow, Scotland, assignor, by mesne assignments, to Owens-Corning Fiberglas Corporation, a corporation of Delaware Application October 13, 1938, Serial No. 234,797
In Great Britain October 15, 1937

3 Claims. (Cl. 154—28)

The present invention relates to methods and apparatus for producing special shapes of fibrous bodies for use in heat and sound insulation or the like, and has for one of its objects the manufacture from fibrous materials, such as glass wool, bodies of complex shapes, such as coverings for pipe bends or junctions, valve coverings and other analogous bodies which cannot readily be made by bending flat sheets of the insulating materials.

When bending flat bodies of insulating materials, difficulty is experienced in filling all of the recesses and cavities around the contours of the complex shapes. In addition, the flat bodies require unusual and special cutting in order to have their edges coincide after they have been folded around the shapes. Moreover, it is difficult to regulate the density and distribution of the material when using ordinary insulating wool. By the use of the present invention, however, the distribution and density of material may be regulated with ease so that cavities and voids are filled to the desired depth and density of wool and little or no difficulty is experienced in forming a shape which will fit snugly over the protuberances on the shape and have the edges thereof join smoothly with adjacent bodies of wool or other insulation. In addition, the present invention provides insulation which may be readily and simply covered with cloth paper, metal mesh or other sheet material without requiring the same to also assume all of the special contours of the original complex shape.

Another object is to expedite the production of such insulating bodies.

Various other objects and advantages will become apparent from the following description taken in conjunction with the drawing, in which:

Fig. 1 is an elevational view, partly in perspective, of a fiberizing apparatus in conjunction with a mold for use in practicing the present invention;

Fig. 2 is a cross-sectional fragmentary perspective view of the mold shown in Fig. 1 taken at the line 2—2 thereof;

Fig. 3 is a plan view of a mold and insulation therein for use in insulating a pipe bend and junctions; and Fig. 4 is a plan view of a mold filled with insulation for use in insulating a valve fitting.

The invention comprises a process and apparatus therefor in which the fibrous material is blown directly into a mold of the proper shape by a gaseous medium. The blowing means may be the same as that used to fiberize or attenuate the wool, or it may be an auxiliary blowing means, if desired.

The invention also comprises a mold preferably having perforated walls adapted to receive the fibrous material as it is blown into it and to allow the effluent air to escape through the wall perforations.

Referring now more particularly to Figs. 1 and 2, reference character 10 designates diagrammatically a fibrous glass fiberizing unit which may be similar to that illustrated and described in the British Patent 428,720. The fiberizing apparatus comprises a molten glass container 11, a bushing or feeder 12 adapted to emit a series of streams 13 of molten glass and an attenuating blower 14 adapted to blow and attenuate the streams of viscous glass to the form of wool by means of a gaseous blast emerging from a series of jets therein. The fibers 15 emerging from the blower are conveyed directly by means of the vehicular blast into a mold 16 positioned beneath the blower. The mold 16 consists of a perforated concave and curved wall 17 adapted to conform to a half section of pipe covering for a pipe bend. The underside of the wall 17 communicates with a conduit 18 which leads into a suction means 19 adapted to exhaust the vehicular blast. The fibers 15 collect on the wall 17 and conform to the contours thereof in the form of a pipe covering section 20. If desired, the wall 17 may be moved during the filling process in relation to the blower 14 in order to fill the mold as desired and facilitate proper distribution.

If desired, I may combine with the outer surfaces of the wall 17 of the mold a slidable shutter 22 conforming to the said wall 17 for controlling the egress of air and enabling the mold to be filled progressively. The said shutter covers the perforations in the wall, thus preventing the vehicular air from carrying wool to the covered perforations and causing all of the wool to be carried to the uncovered perforations.

Fig. 3 illustrates a modified construction wherein a mold 25 is adapted to produce an insulation body 26 having a section 27 adapted to cover a reverse bend in a pipe, and sections 28 adapted to cover pipe junctions.

Fig. 4 illustrates another modification wherein a mold 30 is shown having contours adapted to form an insulation body 31 having the form of a valve fitting.

In place of the blower 14 and fiberizing apparatus 10, various other types of blowers adapted to blow glass wool may be used, such as, for example, the blowing method shown in the United States Patent 1,728,837 or 2,092,783.

Modifications may be resorted to within the spirit and scope of the appended claims.

I claim:

1. The method of producing a fibrous insulating body having a concave form adapted to cover a pipe, valve fitting, pipe junction or the like, which comprises flowing a plurality of streams of molten glass, attenuating said streams into fibrous form by means of a gaseous vehicular blast, directing said blast into a perforated mold having a shape conforming with the object to be insulated, and limiting the passage of the blast through the perforated mold to a restricted area advancing progressively across the mold to deposit said wool over the surface of said mold progressively to build the same up into a loose insulating mass having a shape conforming with said mold and object to be insulated.

2. Apparatus for producing a heat and sound insulating body of irregular non-planular shape, which comprises means for blowing fibrous material by means of a vehicular gaseous blast, an open mold having perforated walls of a shape conforming to the contours of the object to be insulated and in position to receive the said vehicular blast and fibrous material, means for exhausting said vehicular blast beyond said walls, and a slidable shutter juxtaposed to said perforated walls capable of covering said walls to block the passage of the vehicular blast therethrough and capable of being withdrawn to progressively permit the passage of the vehicle through said walls across the surface thereof.

3. The method of producing a fibrous insulating body having a concave form adapted to cover a pipe, valve fitting, pipe junction or the like which comprises flowing a plurality of streams of molten glass, attenuating said streams into fibrous form by means of a gaseous vehicular blast, directing said blast against a perforated mold having a shape conforming to the shape of an object to be insulated, applying suction to the mold to draw said blast through the perforations of the mold while simultaneously covering certain of the perforations and subsequently uncovering the same in succession to progressively build up the insulating body.

ALFRED LINDSAY FORSTER.